(12) United States Patent
Fahrni

(10) Patent No.: US 11,143,276 B2
(45) Date of Patent: Oct. 12, 2021

(54) CONTINUOUSLY VARIABLE TRANSMISSION AND METHOD FOR OPERATING A CONTINUOUSLY VARIABLE TRANSMISSION

(71) Applicant: Dieter Gerhard Fahrni, Dogern (DE)

(72) Inventor: Dieter Gerhard Fahrni, Dogern (DE)

( * ) Notice: Subject to any disclaimer, the term of this patent is extended or adjusted under 35 U.S.C. 154(b) by 0 days.

(21) Appl. No.: 16/975,950

(22) PCT Filed: Feb. 27, 2019

(86) PCT No.: PCT/EP2019/054833
§ 371 (c)(1),
(2) Date: Aug. 26, 2020

(87) PCT Pub. No.: WO2019/166478
PCT Pub. Date: Sep. 6, 2019

(65) Prior Publication Data
US 2020/0400224 A1 Dec. 24, 2020

(30) Foreign Application Priority Data

Feb. 27, 2018 (DE) .......................... 102018104465.8

(51) Int. Cl.
*F16H 29/02* (2006.01)
(52) U.S. Cl.
CPC .................... *F16H 29/02* (2013.01)
(58) Field of Classification Search
CPC ........... F16H 29/02; F16H 29/04; F16H 29/08
See application file for complete search history.

(56) References Cited

U.S. PATENT DOCUMENTS

| | | | | |
|---|---|---|---|---|
| 3,995,508 A | * | 12/1976 | Newell | B62M 9/08 474/50 |
| 5,709,626 A | * | 1/1998 | Lopatik | F16H 3/44 475/14 |
| 5,772,546 A | * | 6/1998 | Warszewski | B62M 9/08 474/50 |
| 7,878,935 B2 | * | 2/2011 | Lahr | F16H 29/02 475/185 |
| 2002/0100340 A1 | * | 8/2002 | Buonauro | F16H 29/08 74/143 |
| 2005/0229731 A1 | * | 10/2005 | Parks | F16H 29/04 74/122 |
| 2006/0154774 A1 | * | 7/2006 | Naude | F16H 29/04 475/16 |
| 2007/0200208 A1 | * | 8/2007 | Wang | F16H 55/17 257/668 |
| 2010/0199805 A1 | * | 8/2010 | Downs | F16H 21/36 74/837 |

(Continued)

FOREIGN PATENT DOCUMENTS

| | | |
|---|---|---|
| FR | 642742 | 9/1928 |
| GB | 2160271 | 12/1985 |
| WO | 2007062841 | 6/2007 |

*Primary Examiner* — David M Fenstermacher
(74) *Attorney, Agent, or Firm* — Volpe Koenig

(57) ABSTRACT

A continuously variable transmission (1) having the cams (9, 10, 11, 12) that are not circular as usual, but have the form of a spiral. The outer contours (15, 16, 7, 18) of the two cams (9, 10, 11, 12) are each situated in a plane which is perpendicular to the direction of rotation of the respective cams (9, 10, 11, 12).

20 Claims, 13 Drawing Sheets

(56) References Cited

U.S. PATENT DOCUMENTS

| | | | | |
|---|---|---|---|---|
| 2010/0304915 | A1* | 12/2010 | Lahr | F16H 29/04 475/207 |
| 2015/0292605 | A1* | 10/2015 | Nishimura | F16H 29/04 74/117 |
| 2015/0354607 | A1* | 12/2015 | Avni | F04B 1/043 60/428 |
| 2018/0251333 | A1* | 9/2018 | Knierim | G01R 33/3802 |

* cited by examiner

US 11,143,276 B2

CONTINUOUSLY VARIABLE TRANSMISSION AND METHOD FOR OPERATING A CONTINUOUSLY VARIABLE TRANSMISSION

TECHNICAL FIELD

The invention relates to a continuously variable transmission with a transmission stage, which has a driving shaft which rotates about a first rotation axis and a driven shaft which rotates about a second rotation axis, wherein a driving cam disk is coupled to the driving shaft and a driven cam disk is coupled to the driven shaft, and wherein the driving cam disk and the driven cam disk are coupled to one another in terms of movement via at least one force-transmitting means. The invention also relates to a method for operating a continuously variable transmission.

BACKGROUND

Continuously variable transmissions of the type described immediately above are already known from the prior art. For example, continuously variably adjustable planetary transmissions exist in which, as force-transmitting means, balls are used which are tilted for the purposes of the continuously variable adjustment of the transmission ratio. Such transmissions are used for example in bicycles.

Such transmissions are not free from slippage, such that friction losses arise which can have an adverse effect on the efficiency of the transmission.

SUMMARY

The invention is based on the object of improving the usage characteristics of a continuously variable transmission, in particular alleviating or eliminating the above-described disadvantages of the prior art.

To achieve this object, one or more features of the invention are provided. In particular, it is thus provided according to the invention, in order to achieve the stated object in the case of a continuously variable transmission of the type described in the introduction, that the driving cam disk and the driven cam disk each have a spiral-shaped outer contour, that the outer contour of the driving cam disk is arranged in a first plane, which is oriented perpendicular to the first rotation axis, and that the outer contour of the driven cam disk is arranged in a second plane, which is oriented perpendicular to the second rotation axis. Here, the cam disks themselves are also preferably of flat form.

If cam disks with a spiral-shaped outer contour are used, the ratio of arc length of the outer contour and rotational angle of the cam disk does not remain constant, but rather is variable, by contrast to the situation with customary circular cam disks. This lack of constancy can be utilized in order, as will be discussed in more detail in this document, to permit a continuously variable adjustment of a transmission ratio. Here, the transmission of force can be realized without slippage, for example in the form of a toothed-gear transmission or a belt transmission.

Based on the planar configuration of the outer contours, it is possible in particular to improve the transmission of force, because, during the transmission of force, the force-transmitting means can run off in a straight manner, and, for example, a belt cannot slip off.

Therefore, based on the proposed solution, advantages are achieved in relation to the prior art, such as for example a slippage-free transmission of force which therefore involves low losses, such that, with the invention, it is possible to attain a high level of efficiency of continuously variable transmissions. In this way, the usage characteristics of continuously variable transmissions are improved.

According to the invention, the continuously variable transmission may have exactly one transmission stage or else more than one transmission stage. If the continuously variable transmission has exactly one transmission stage, then it can also be stated that the continuously variable transmission is formed by said transmission stage. Thus, where features of a continuously variable transmission are described below and these features do not necessarily assume a multiplicity of transmission stages, these features may also be regarded as features of the transmission stage itself.

In one advantageous refinement of the continuously variable transmission, it may be provided that the first rotation axis and the second rotation axis are parallel or coincide with one another. Furthermore, it may be provided that the first plane and the second plane are parallel or coincide with one another. It may be particularly advantageous if the outer contours of the two cam disks lie in one plane. The above-mentioned refinements have the advantage that a particularly effective transmission of force is made possible. Refinements of this type may have the advantage that, for example, shear forces of a force-transmitting belt do not arise on the outer contours of the cam disks, such that the belt can be prevented from slipping off laterally.

In a further advantageous refinement of the continuously variable transmission, which is possibly of particularly high independent inventive quality, it may be provided that the force-transmitting means is of belt-like form. The force-transmitting means is preferably a belt, a band or a chain. Such belt-like force-transmitting means are particularly highly suitable, in the case of spiral-shaped cam disks which deviate from a circular shape, for achieving a transmission of force with high efficiency with high variability of a transmission ratio.

It may however alternatively also be provided that the force-transmitting means is formed by a toothing of the cam disks. Here, the cam disks are preferably formed as spiral-shaped toothed-gear portions. If more than one force-transmitting means is formed, it is also possible for belt-like and toothed force-transmitting means to be combined with one another.

In a further advantageous refinement of the continuously variable transmission, it may be provided that the spiral-shaped outer contours of the driving and driven cam disks are oriented in the same direction. This makes particularly simple continuously variable transmissions possible, because, in particular in the case of an identical orientation of the cam disks, it is possible to realize transmissions which do not require further transmission stages connected upstream or downstream. The question of whether the cam disks are oriented in the same direction or are oriented in opposite directions is to be understood in a functional sense. An orientation in the same direction is present if, in the case of an increase of the radius of one cam disk which is performing a swinging movement, the radius of the other cam disk likewise increases. This may be achieved for example if the sense of revolution of the spiral openings of both cam disks is oriented in the same direction, and the movement coupling of the two cam disks effected with the force-transmitting means in each case causes a swinging movement with the same sense of rotation. Functional orientation of the cam disks in the same direction may also be achieved if the sense of revolution of the spiral openings of the two cam disks is oriented oppositely and the movement coupling of the two cam disks effected with the force-transmitting means in each case causes a swinging movement with opposite sense of rotation.

By contrast, the cam disks are oriented in opposite directions if, with an increase in the radius of one cam disk, the radius of the other cam disk decreases. Orientation of the cam disks in opposite directions may be achieved in different ways in an analogous manner to that described above in the case of the orientation in the same direction, that is to say in particular through the use of cam disks with the same sense of revolution, and rotational coupling with reversing action, or with opposite sense of revolution, but rotational coupling in the same sense.

In the case of the transmissions described above with cam disks oriented in the same direction, it may particularly advantageously be provided that the outer contour of the driving and/or of the driven shaft are or is shaped such that a transmission ratio of the transmission stage remains constant during a movement of the driving cam disk and of the driven cam disk. Alternatively or at the same time, it may be provided that the outer contour of the driving and/or of the driven shaft is shaped such that a ratio of the angular speeds of the driving and driven cam disks remains constant. Furthermore, it may alternatively or else at the same time be provided that the outer contour of the driving and/or of the driven shaft is shaped such that a ratio of a torque acting at the driving shaft and of a torque effected at the driven shaft remains constant. These refinements may be advantageous because, in this way, it can for example be achieved that, during the operation of a bicycle, the pedaling frequency is scaled linearly with the travelling speed, whereby a pleasant riding feel is achieved.

In a further advantageous refinement of the continuously variable transmission, it may be provided that the spiral-shaped outer contours of the driving and of the driven cam disks are oriented in opposite directions. It can be achieved in this way that, during the operation of the transmission, a transmission ratio from the driving to the driven shaft which changes to a large degree is realized. If this non-linear behavior is reversed again in a transmission stage connected downstream, it is possible to achieve very high transmission ratios which remain constant or at least approximately constant during operation.

In the case of such oppositely oriented cam disks, it may advantageously be provided that the outer contour of the driving and/or of the driven shaft are or is shaped such that a transmission ratio of the transmission stage behaves exponentially during a movement of the driving cam disk with constant angular speed. Alternatively or in addition, it may be provided that the outer contour of the driving and/or of the driven shaft is shaped such that a ratio of the angular speeds of the driving and driven cam disks behaves exponentially. Furthermore, it may alternatively or at the same time be provided that the outer contour of the driving and/or of the driven shaft is shaped such that a ratio of a torque acting at the driving shaft and of a torque effected at the driven shaft behaves exponentially. Such refinements may for example have the advantage that, with these, accurate smooth running can be achieved, with high efficiency.

In a further advantageous refinement of the continuously variable transmission, it may be provided that the spiral-shaped outer contours each describe a mathematical curve, the radial spacing of which from a respective spiral axis is exponential in the arc length of the curve and/or exponential in an angle about the respective spiral axis. Preferably, here, the driving and the driven cam disk are of identical form.

With such cam disks, it is possible, depending on use as a first cam disk, intermediate disk or final cam disk in the force flow, to make good smooth running possible. However, it is also possible for use to be made of other geometries identified by a person skilled in the art which permit exact smooth running with a constant transmission ratio in a manner dependent on the specific embodiment of the transmission.

An identical form of the driving and driven cam disks of the same transmission stage or else across transmission stages may also be generally advantageous in the context of the invention described here, that is to say also in conjunction with other refinements of the invention.

In a further advantageous refinement of the continuously variable transmission, it may be provided that the shape of the spiral-shaped outer contours of the two cam disks is designed as described below. In the case of a first of the two cam disks, which may be the driving or the driven cam disk, with a constant angular graduation and a freely selected starting radius, the value of the radius that follows is increased exponentially. The end radius is selected as desired. The second of the two cam disks starts with a selected radius. Now, the graduations realized on the first cam disk, the spacings on the running surface, are applied to the second cam disk. The radius that follows is then exponentially reduced with the same value with which it has been increased in the case of the first cam disk. In the design, it must be ensured that, here, always the same spiral points of the two cam disks come together. This means that the cam disks must not be rotated relative to one another, and have the same running surface. The cam disks designed in this way can, with corresponding movement coupling, have the advantageous characteristic that, if one of the two cam disks is rotated uniformly, the respective other cam disk is exponentially slowed or accelerated.

In a further advantageous refinement of the continuously variable transmission, it may be provided that the shape of the spiral-shaped outer contours of the two cam disks is designed as described above, wherein, however, by contrast to the embodiment described above, in the case of the first cam disk, an exponential increase occurs not with a constant angular graduation but with uniform graduation of the running surface. The running surfaces of the two cam disks are in this case preferably of different length. This may be expedient if different regions of the spirals can be utilized by variation of the axis spacing or by a diversion of the belt.

In a further advantageous refinement of the continuously variable transmission, it may be provided that the shape of the spiral-shaped outer contours of the two cam disks is designed as described below. A first cam disk with a spiral-shaped outer contour B and a second cam disk with an outer contour C are firstly taken as a starting point, wherein the two cam disks have an axis spacing A. The shape of the outer contours B and C may in particular be designed as has already been described above. Proceeding from these starting conditions, new radii of the outer contours are now designed for both cam disks. The radius of the outer contour E of the second cam disk is calculated in accordance with the formula $E=(A/(B+C))*B$. The radius of the outer contour D of the first cam disk is then calculated in accordance with the formula $D=A-E$.

In a further advantageous refinement of the continuously variable transmission, it may be provided that the outer contour of the driving cam disk and/or the outer contour of the driven cam disk are or is shaped such that a transmission ratio of the transmission stage behaves linearly during a movement of the driving cam disk with constant angular speed. Alternatively or in addition, it may be provided that the outer contour of the driving cam disk and/or the outer contour of the driven cam disk is shaped such that a ratio of the angular speeds of the driving and driven cam disks behaves linearly. Furthermore, it may alternatively or additionally be provided that the outer contour of the driving cam disk and/or the outer contour of the driven cam disk is shaped such that a ratio of a torque acting at the driving shaft and of a torque effected at the driven shaft behaves linearly. Such refinements may be advantageous because they extend the range of use of the continuously variable transmission, as presented for example by the following refinement of the invention.

In a further advantageous refinement of the continuously variable transmission, in order to create a transmission in which the transmission ratio is continuously variably adjustable from a positive range into a negative range and vice versa, it may thus be provided that a differential device is formed by which a movement of the driven cam disk and a movement of a driven adjacently mounted cam disk can be or are linearly superposed. Preferably, with the differential device, a linearly varying movement profile of the driven cam disk can be compensated by way of a linearly varying movement profile of the driven adjacently mounted cam disk, or is compensated in this way.

In the case of such a refinement of the invention, use may be made in particular of the cam disks described immediately above with linear response behavior. Such cam disks with linear response behavior may be used for the driving and driven cam disks and/or for the driving and driven adjacently mounted cam disks. However, it could then be advantageous for the input shaft to be coupled rotationally conjointly to the driving side.

Alternatively, the driven and/or the driven adjacently mounted cam disk may also be of circular form. Then, however, means should be formed by which, in the case of constant rotation of the input shaft, the corresponding driving cam disk is driven in a linearly varying rotation.

The transmission ratio can now be adjusted in continuously variable fashion by the drive swinging movement of the cam disks and/or of the adjacently mounted cam disks being varied by virtue of the cam disks and/or the adjacently mounted cam disks being rotated further, such that the swinging range is changed. In this way, forward and backward drive, but also a standstill, are possible.

The differential device may for example be a differential transmission, which is preferably designed as a planetary transmission.

In a further advantageous refinement of the continuously variable transmission, it may be provided that the shapes of the spiral-shaped outer contours of the two cam disks, the centers of rotation of which have a constant spacing of D, are designed iteratively as described below and illustrated in FIG. 13. Firstly, a small angle a is selected. The smaller a is selected to be, the more exactly the result corresponds to that which is ideally desired. Furthermore, an initial angle b0 is selected, which is increased linearly by a value c from iteration to iteration: $b_i = b_0 + i*c$. Now, the radii ri of the driving cam disk and Ri of the driven cam disk are calculated iteratively, wherein it is stipulated that the sum of the radii corresponds to the spacing D: $r_i + R_i = D$. As can be seen in FIG. 13, for the design, two right-angled triangles are used which are already sufficiently determined by two parameters. Since the two triangles have the same height h, the triangles are already sufficiently determined by specification of a, bi and D. From this, it is then possible to uniquely calculate the radii ri and Ri. When ri and Ri have then been calculated, the cam disks are designed as follows. For the driving cam disk, the starting radius thereof is fixedly set to r0. Then, the radius is increased step-by-step in accordance with the calculated values r1, r2, r3 etc. Here, the outer contour is advanced in each case by a value h from step-to-step. The driven cam disk is designed correspondingly, wherein R0 is selected as starting radius, and the radii are increased in accordance with the calculated values R1, R2, R3 etc. The cam disks thus designed can, with corresponding movement coupling, have the advantageous characteristic that, when one of the two cam disks is rotated uniformly, the respective other cam disk is linearly slowed or accelerated.

Further uses of the continuously variable transmission are made possible if it is provided that the spiral-shaped outer contours each describe a mathematical curve, the radial spacing of which from a respective spiral axis is described by a mathematical function, of which the first derivative with respect to the arc length of the curve or with respect to the angle about the respective spiral axis is monotonously decreasing. This characteristic is exhibited for example by the cam disks which are designed as described above and discussed in more detail in FIG. 13.

In a further advantageous refinement of the continuously variable transmission, it may be provided that the transmission stage comprises means with which an advancing force action point, formed on the outer contour of the driving cam disk, for the force-transmitting means and an advancing force action point, formed on the outer contour of the driven cam disk, for the force-transmitting means are movable relative to one another. In this way, it is made possible for the transmission ratio to be varied in a flexible manner.

In order to make possible a particularly simple flexible facility for adjusting the transmission ratio, it may be provided in a further advantageous refinement of the continuously variable transmission that the driving cam disk and the driven cam disk are arranged so as to be spaced apart, preferably in parallel, with an axis spacing to one another, wherein the axis spacing is variable. Means, in particular in the sense described above, may be formed for the variation of the axis sp acing.

The transmission ratio is advantageously adjustable in a further refinement of the continuously variable transmission, in the case of which it is provided that, between the driving and the driven cam disk, there is arranged a movable diverting roller by which a length of a force-transmitting portion of a or the belt-like force-transmitting means is variable. The diverting roller may preferably be a means in the sense already mentioned above.

In a further refinement of the continuously variable transmission, which is possibly of particularly high independent inventive quality, it may be provided that the transmission stage is implemented twofold. The twofold implementation of the transmission stage makes high-quality smooth running possible during the force-transmitting operation. It may be particularly advantageous if the cam disks of a first implementation of the transmission stage are, during operation, able to swing in a phase-offset manner in relation to the cam disks of a second implementation of the transmission stage. This makes it possible that, during operation, always one cam disk is usable for transmitting force, because enough time remains as a result to pivot the other cam disk back into an initial state, proceeding from which said other cam disk can perform the transmission of force again. The phase offset is preferably such that the cam disks are able to swing in an alternating manner and/or in a manner offset by half of one phase.

In one advantageous refinement of the transmission implemented in twofold form, it may be provided that a changeover device is formed, by which a rotational movement of an input shaft can be or is converted into a phase-offset swinging movement, preferably an alternating swinging movement and/or a swinging movement offset by half of one phase, of mutually corresponding cam disks of the first and second implementations of the transmission stage. Preferably, the input shaft is one of the driving shafts. Preferably, the transmission is furthermore configured such that one implementation of the transmission stage is returned, free from load, into an initial state while the other implementation of the transmission stage effects a transmission of force to the driven shaft. For this purpose, it is for example possible for in each case one clutch to be provided, in particular one freewheel between driven cam disk and driven shaft. Furthermore, it may also be provided that there is a time overlap during which both implementations of the transmission stage effect a transmission of force. By the use of these refinements of the invention, it is possible in particular for uninterrupted force-transmitting operation of the transmission to be achieved.

In one advantageous refinement of a continuously variable transmission which has a changeover device, it may be provided that a reconverter is provided which is configured to combine the phase-offset, preferably alternating, swinging movement of the mutually corresponding cam disks of the first and second implementations of the transmission stage into a rotational movement of the driven shaft. Preferably, the reconverter has, for each implementation of the transmission stage, in each case one clutch which transmits a torque to the driven shaft during a working swinging movement of the respective implementation of the transmission stage. This may be performed for example by a freewheel clutch. Such a configuration has the advantage that, with this, continuous driving of a load can be achieved, but at the same time a continuously variable transmission ratio can be set.

In a further refinement of the continuously variable transmission, which is possibly of particularly high independent inventive quality, it may be provided that the above-described transmission stage forms a first transmission stage, and that a second transmission stage is formed which is likewise designed according to the invention. The second transmission stage thus has the features which the above-described transmission stage has according to the invention or in refinements, though need not be identical to the first transmission stage. It can therefore also be stated that the second transmission stage has the features which are assigned to the above-described transmission stage in a patent claims directed to a continuously variable transmission. Furthermore, in the case of the further refinement of the invention described here, it is provided that the driven cam disk of the first transmission stage and the driving cam disk of the second transmission stage are coupled angularly consistently with respect to one another. It is preferably provided here that a common rotation or pivot axis is formed. With such refinements of the invention, particularly large ranges of transmission ratios are for example possible.

Preferably, the driving cam disk of the first transmission stage and the driven cam disk of the second transmission stage are structurally identical. Furthermore, the driven cam disk of the first transmission stage and the driving cam disk of the second transmission stage are structurally identical. Furthermore, the latter two cam disks are preferably oriented in the same direction, whereas the driving cam disks and the driven cam disks of the same transmission stage are in each case preferably oriented in opposite directions. Particularly flexible transmission ratios can be configured in this way.

In order to achieve high-quality smooth running, it may be provided, in the refinements described immediately above which have two transmission stages, that a ratio of radial axis spacings of force action points to one another remains constant in the sense that $r\_1a/r\_1b * r\_2a/r\_2b = const$, where $r\_xy$ describes the radial spacing of the action point or holding point of the cam disk xy from the spiral axis xy, where xy=xa describes the driving cam disk of the transmission stage x, and xy=xb describes the driven cam disk of the transmission stage x.

If the continuously variable transmission, as described above, has two transmission stages, it may be provided that, for the variation of a transmission ratio of the transmission, for example of the transmission ratio already mentioned above, the driven cam disk of the first transmission stage is rotatable relative to the driving cam disk of the second transmission stage. This constitutes a relatively simple facility for changing the transmission ratio. The relative rotation may be performed for example by a relative-rotation device.

Furthermore, according to the invention, to achieve the stated object, the features of the coordinate claim directed to a method are provided. In particular, to achieve the stated object, it is thus provided according to the invention, in the case of a method of the type described in the introduction, that a transmission stage which has a cam disk with spiral-shaped outer contour is implemented twofold, that the two transmission stages are alternately engaged and disengaged, and that the respectively disengaged transmission stage is returned into an initial state while the respectively engaged transmission stage effects a transmission of force to a driven shaft. This method permits slippage-free transmission of force, with low losses, in the use of a continuously variable transmission with spiral-shaped cam disks. Preferably, the continuously variable transmission is designed according to the invention, in particular as described above and/or according to one of the patent claims directed to a continuously variable transmission. The above-described method can be implemented particularly advantageously with transmissions of said type.

BRIEF DESCRIPTION OF THE DRAWINGS

The invention will now be described in more detail on the basis of a small number of exemplary embodiments, but is not restricted to this small number of exemplary embodiments. Further exemplary embodiments arise from combination of the features of individual or several patent claims with one another and/or with individual or several features of the exemplary embodiments.

In the figures.

DETAILED DESCRIPTION

Figure 1:
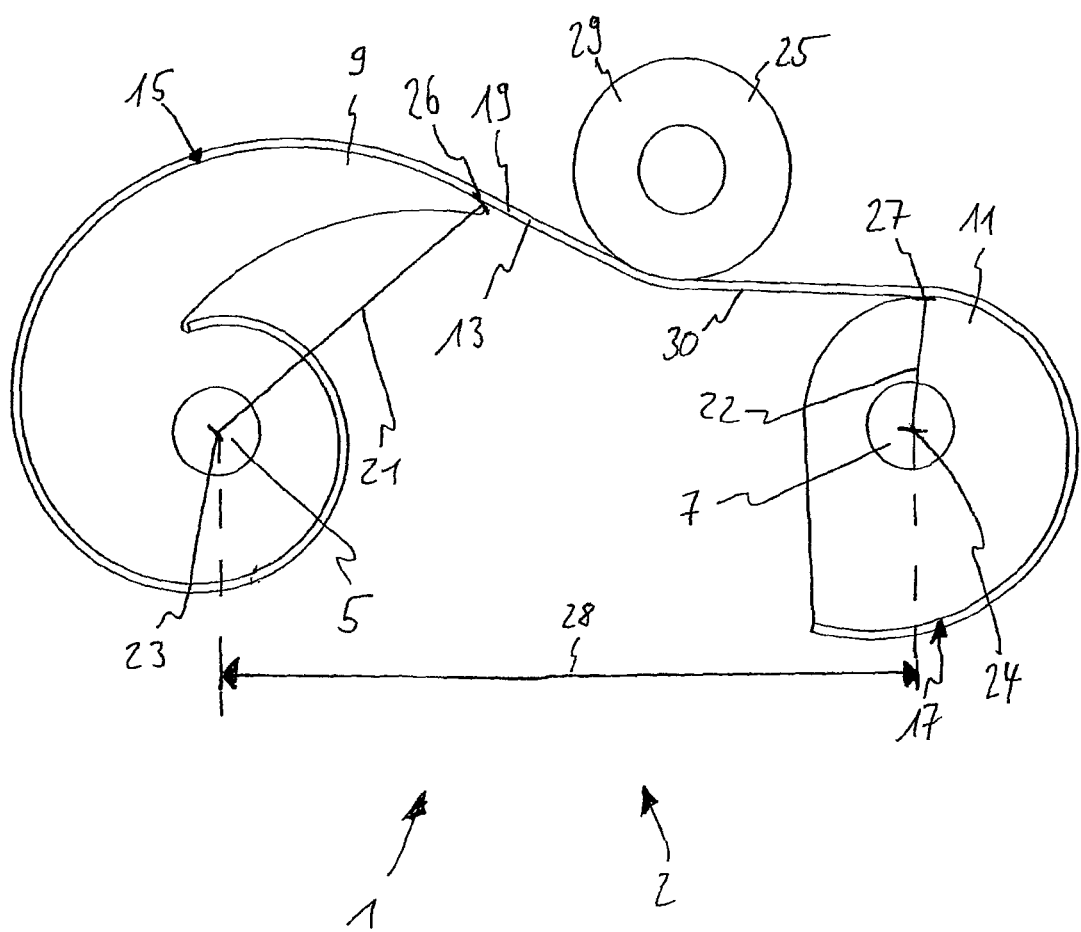
FIG. 1 shows a continuously variable transmission 1 according to the invention with a transmission stage 2.

In the following description of the various exemplary embodiments of the invention, elements which correspond in terms of their function are denoted by the same reference numerals even in the case of different design or shaping.

FIG. 1 shows a continuously variable transmission 1 according to the invention with a transmission stage 2. The transmission 1 comprises a driving cam disk 9 with a spiral-shaped outer contour 15, and comprises a driven cam disk 11, likewise with a spiral-shaped outer contour 17. By use of the driving shaft 5, the driving cam disk 9 can be set in a swinging and rotational movement about the rotation axis of the shaft 5. A first end of a force-transmitting means 13 in the form of a belt 19 is held on the outer contour 15 of the driving cam disk 9. Forces can be transmitted from the driving cam disk 9 to the driven cam disk 11 by the force-transmitting means 13. For this purpose, the two cam disks 9, 11 are mechanically coupled to one another via the force-transmitting means 13. For this purpose, a second end of the force-transmitting means 13 is held by the driven cam disk 11. If the driving cam disk 9 is now set in motion, the driven cam disk 11 is also set in rotational motion owing to the mechanical coupling. The two cam disks 9, 11 are thus coupled in terms of motion.

If the transmission 1 is used for example for the operation of a bicycle, it may be provided that the driving shaft 5 is coupled to the pedals and the driven shaft 7 is coupled to the force-converting hub of one of the two wheels.

Here, the cam disks 9, 11 are shaped such that a transmission ratio remains constant during rotation of the cam disks 9, 11. For this purpose, the two cam disks 9, 11 are functionally oriented in the same direction. This has the effect that, during movement of the cam disk 9, the spacing 21 of an advancing force-transmitting point 26 of the driving cam disk 9 from the spiral axis 23, which coincides with the rotation axis of the shaft 5, increases or decreases, considered relatively, to the extent to which the spacing 22 of an advancing force-transmitting point 27 of the driven cam disk 11 from the spiral axis 24 also increases or decreases. Here, the force-transmitting points 26, 27 are formed by that point on the respective outer contour 15, 17 at which the force-transmitting means 13 separates from the respective outer contour 15, 17. To achieve the orientation of the cam disks 9, 11 in the same direction, the spiral openings of the two cam disks 9, 11 have an identical sense of revolution, and the force-transmitting means 13 connects the two cam disks 9, 11 such that rotational coupling with the same sense of rotation is realized.

At the same time, the cam disks 9, 11 are shaped such that a ratio of the angular speeds of the driving cam disk 9 and of the driven cam disk 11 remains constant and such that a ratio of a torque acting at the driving shaft 5 and of a torque effected at the driven shaft 7 remains constant.

The outer contours of the cam disks 9, 11 are arranged in a common plane. This plane is in each case perpendicular to the axes of rotation of the driving shaft 5 and of the driven shaft 7. Here, the two shafts 5, 7 are oriented parallel to one another.

For the variation of the transmission ratio, a diverting roller 29 is provided which is movable in the above-mentioned common plane. Here, the force-transmitting means 13 lies against the diverting roller 29 and can thus be diverted to a greater or lesser extent by variation of the position of the diverting roller 29. In this way, it is thus possible for the length of that portion 30 of the force-transmitting means 13 which is situated between the two force action points 26, 27 to be varied. The diverting roller 29 thus constitutes a means 25 for moving the two force action points 26, 27 relative to one another. In this way, the ratio of the radii 21, 22 to one another can be varied, as a result of which the transmission ratio can also be changed.

In an alternative exemplary embodiment, instead of the diverting roller 29, it is provided that the axis spacing 28 is variable. In this way, too, the transmission ratio can be changed.

Figure 2:
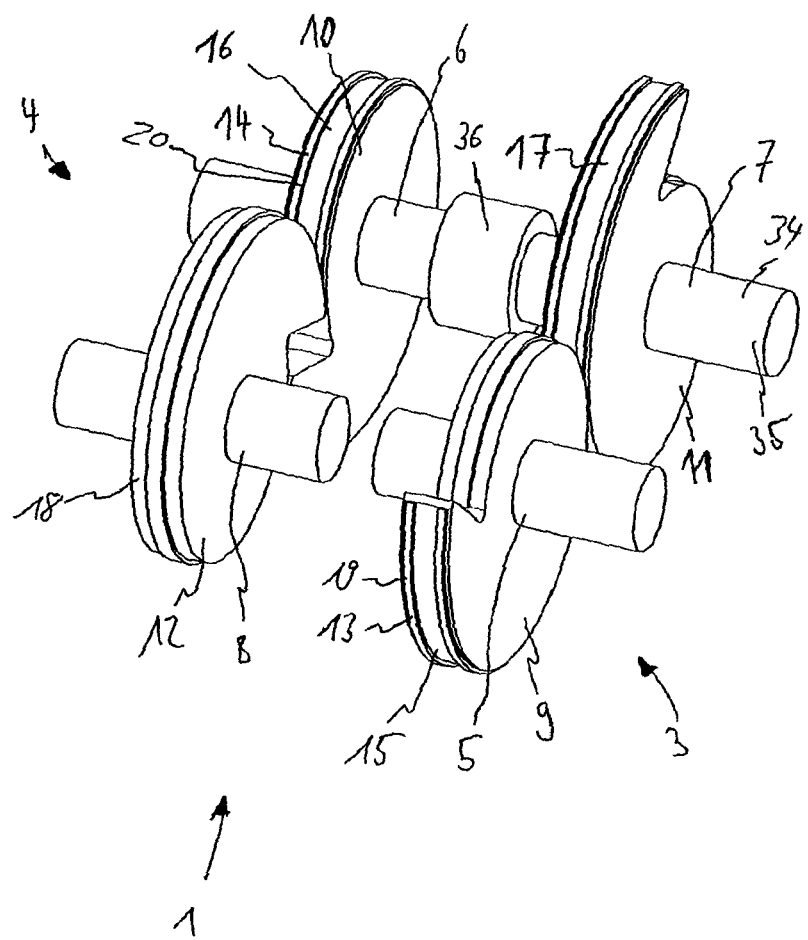
FIG. 2 shows a continuously variable transmission 1 according to the invention with two transmission stages 3 and 4.
Figure 3:
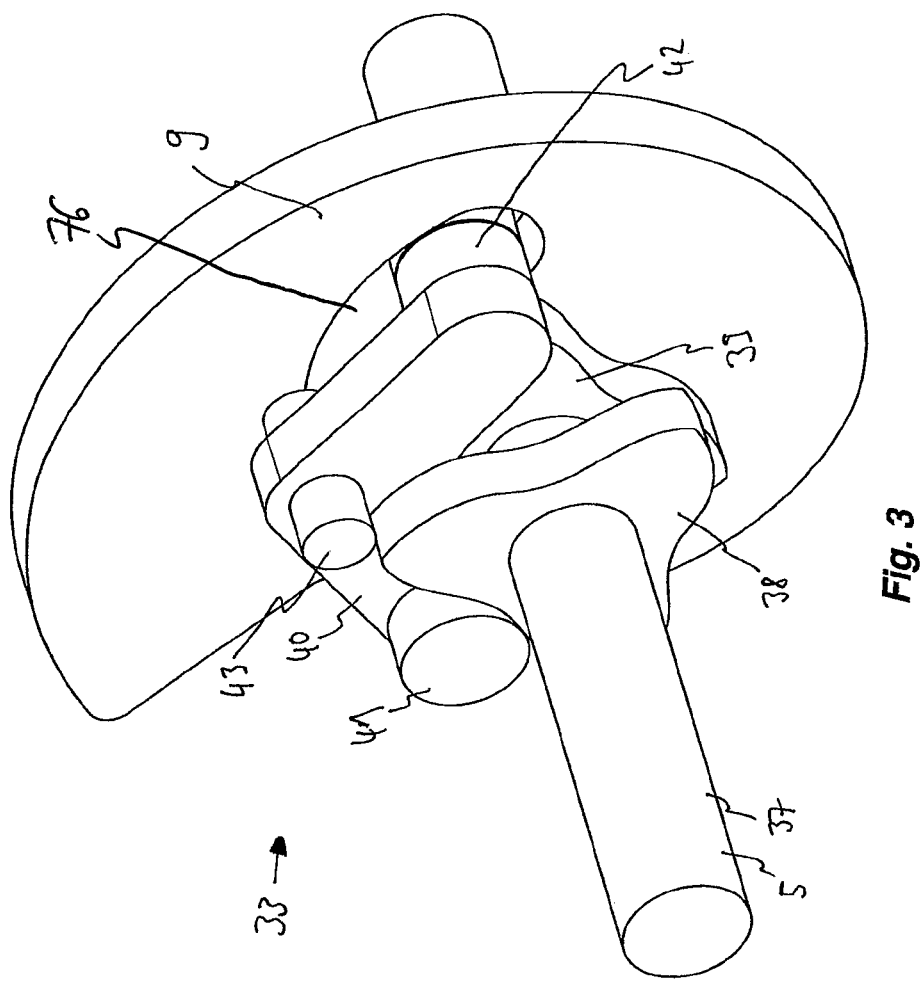
FIG. 3 to FIG. 6 show the construction of a changeover device 33 of a continuously variable transmission 1 according to the invention.
Figure 4:
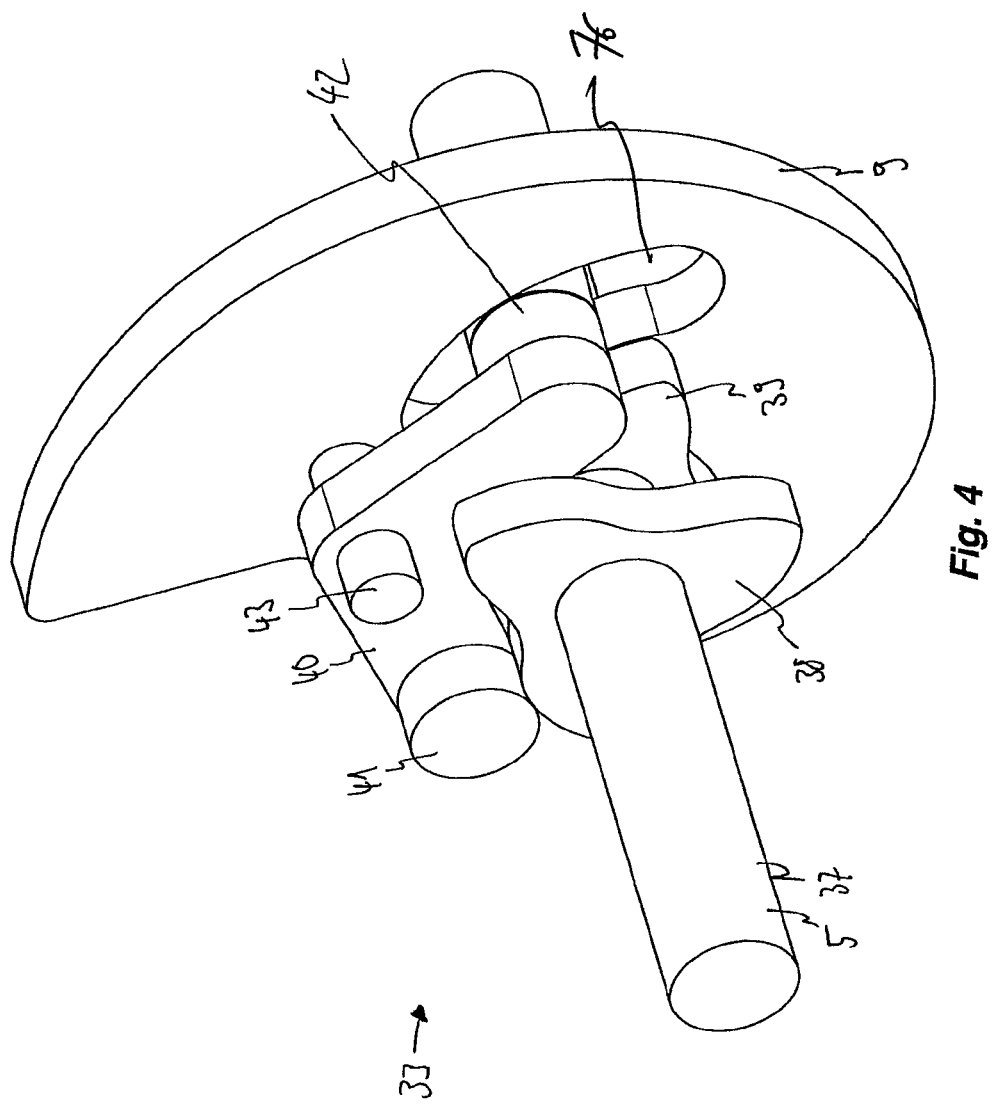
Figure 5:
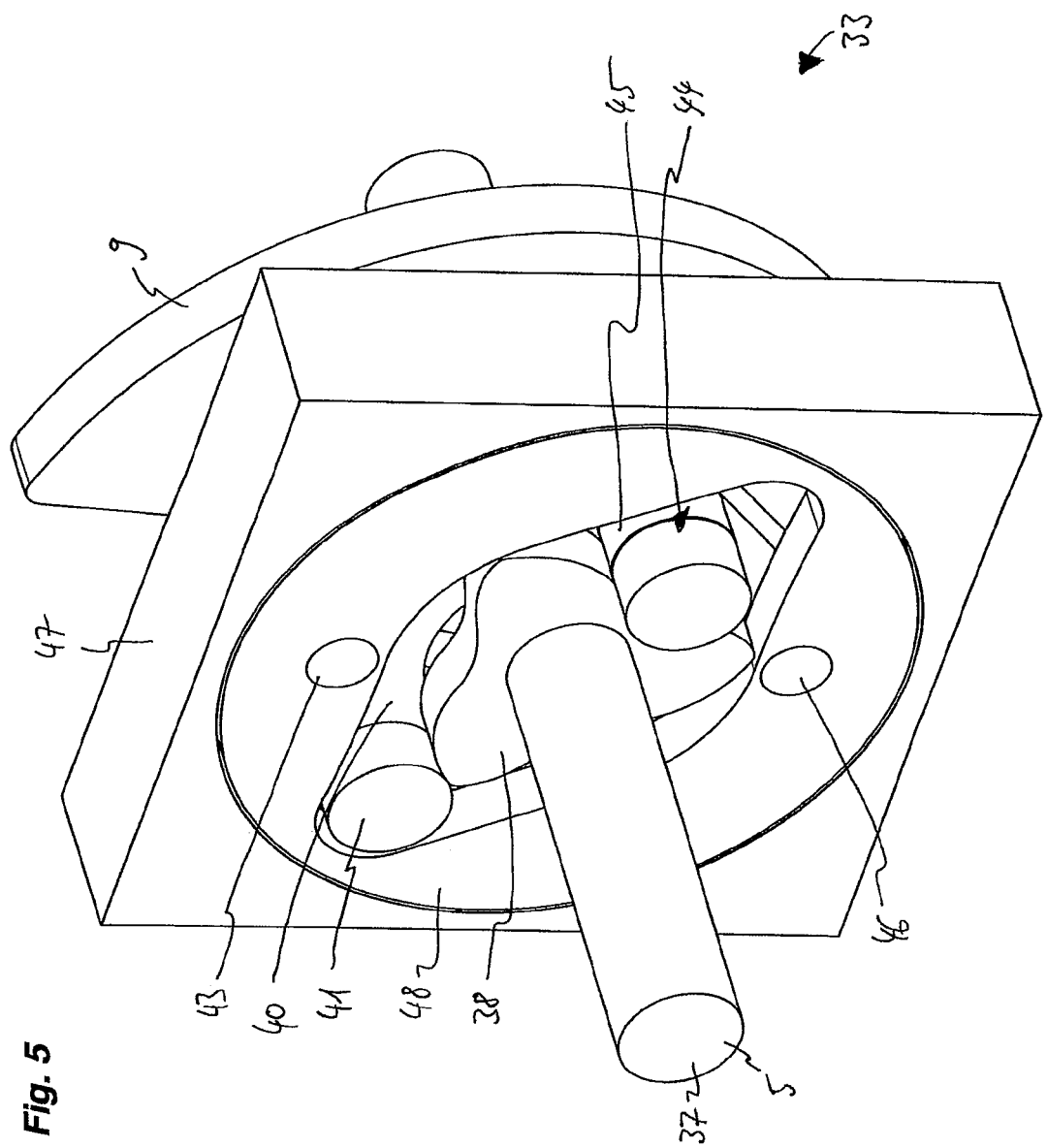

FIG. 2 shows a continuously variable transmission 1 according to the invention with a first transmission stage 3 and with a second transmission stage 4. The two transmission stages 3, 4 are of similar design to that shown in FIG. 1, and in particular, the outer contours 15, 17 and 16, 18 of the cam disks 9, 11 and 10, 12, respectively, are of spiral-shaped form. Certain differences however also exist.

For example, the two cam disks 9, 11 and 10, 12 of the respective transmission stage 3, 4 are, in functional terms, oriented oppositely. This means that, during operation, the radial spacing of one force action point increases while the spacing of the other force action point decreases. Although the spiral openings of the driving cam disks 9, 11 and of the driven cam disks 10, 12 on the same transmission stage 3, 4 have in each case the same sense of revolution, the force-transmitting means 13, 14 are however arranged in a crossing-over manner, such that they effect a reversing rotational coupling action.

Furthermore, the driving cam disk 9 of the first transmission stage 3 and the driven cam disk 12 of the second transmission stage 4 are structurally identical. They however differ from the two other, likewise structurally identical cam disks 10, 11.

The cam disks 9, 10, 11, 12 are shaped such that a transmission ratio of the respective transmission stage 3, 4 behaves exponentially during a movement of the respectively driving cam disk 9, 10 at constant angular speed. Furthermore, the shape is such that, on each of the transmission stages 3, 4, a ratio of the angular speeds of the respectively driving and driven cam disks 9, 10, 11, 12 behaves exponentially, and such that, in each case, a ratio of a torque acting at the driving shaft 5, 6 and of a torque effected at the driven shaft 7, 8 behaves exponentially.

The driving shaft 6 of the second transmission stage 4 is in this case coupled angularly consistently to the driven shaft 7 of the first transmission stage 3. These two shafts 6, 7 thus form a common rotation and pivot axis. This has the effect that the exponential variation of the transmission ratio on the first transmission stage 3 during operation is fully compensated, such that, overall, there is a constant transmission ratio between the driving shaft 5 of the first transmission stage 3 and the driven shaft 8 of the second transmission stage 4.

In the exemplary embodiment shown in FIG. 2, the rotation axes of the driving cam disk 9 of the first transmission stage 3 and of the driven cam disk 12 of the second transmission stage 4 coincide with one another. Effectively, the transmission 1 which is shown thus has only two rotation and pivot axes.

In an alternative exemplary embodiment, the transmission 1 has a total of three parallel rotation and pivot axes which lie in one plane, wherein the rotation and pivot axis 34, 35 of the two cam disks 10, 11 which are arranged centrally from a functional point of view is also arranged centrally from a geometrical point of view between the rotation and pivot axis of the driving cam disk 9 of the first transmission stage 3 and the rotation and pivot axis of the driven cam disk 12 of the second transmission stage 4.

It may thus expediently be provided, for example for the operation of a bicycle, that the driving shaft 5 of the first transmission stage 3 is coupled to the pedals, and the driven shaft 8 is coupled to the force-converting hub of one of the wheels of the bicycle.

For the adaptation of the transmission ratio, a relative-rotation device 36 is provided, by which the driving shaft 6 of the second transmission stage 4 is adjustable relative to the driven shaft 7 of the first transmission stage 3. By a relative rotation of the two shafts 6, 7, it is effected, depending on the refinement, that the ratio of the radial spacings of the cam disks 10, 12 of the second transmission stage 4 and/or of the cam disks 9, 11 of the first transmission stage 3 is varied, such that the transmission ratio is changed.

FIG. 3 to FIG. 6 show the construction of a changeover device 33 of a continuously variable transmission 1 according to the invention, wherein, for improved understanding, further components of the changeover device 33 are illustrated successively with increasing figure number. FIG. 3 to FIG. 6 will be described jointly below.

The changeover device 33 has an input shaft 37, which may for example be identical to the driving shaft 5. A first pivoting disk 38 and a second pivoting disk 39 are fixed to the input shaft 37. The pivoting disks 38, 39, which are of similar form or, in other exemplary embodiments, identical form, have 120° symmetry, wherein the disk radius varies over the angle with a maximum and a minimum. The two pivoting disks 38 and 39 are rotationally offset with respect to one another by 60°, such that, during rotation of the input shaft 37, said pivoting disks are operated in antiphase. When the radius of the first pivoting disk 38 falls to a minimum, the radius of the second pivoting disk 39 falls to a maximum, and vice versa.

The pivoting disks 38, 39 may also be designed such that a maximum of one pivoting disk 38, 39 does not fall to a minimum of the other pivoting disk 39, 38 at the same time. Thus, in the case of corresponding design of the outer contour of the pivoting disks 38, 39, along one direction of rotation, the angle from a minimum to a maximum may be greater than the angle from a maximum to a minimum. This may have the advantage that the duration of the forward swinging can differ from the duration of the backward swinging, such that, in the case of a twofold implementation 72, 74 of the transmission stage 2, 3, 4, enough time remains that the force transmission can be taken over by the respective other implementation 72, 74 of the transmission stage 2, 3, 4.

Roller levers 40, 44 which are rotationally offset with respect to one another by 180° are operatively connected to the first pivoting disk 38. The same applies to the second pivoting disk 39. The first roller lever 40 has a first roller 41, a second roller 42 and a third roller 43. Since, in the exemplary embodiment described here, the two roller levers 40, 44 are of identical form, the second roller lever 44 also has a total of three rollers, of which only the second roller 45 and the third roller 46 are visible in the figures.

The first roller 41 and the second roller 42, 45 is positively controlled in each case by the pivoting disks 38, 39. Due to the antiphase arrangement of the pivoting disks 38, 39 and the 120° symmetry thereof, and owing to the arrangement of the roller levers 40, 44 rotationally offset with respect to one another by 180°, the roller levers 40, 44 likewise move in antiphase. The second roller 42, 45 drives in each case one cam disk 9, 49. In the exemplary embodiment shown here, the second roller 42 of the first roller lever 40 drives the driving cam disk 9 already described above. The second roller 45 of the second roller lever 44 drives the driving cam disk 49. The latter cam disk 49 is, in the exemplary embodiment described here, of identical form to the corresponding driving cam disk 9.

For the drive of the cam disk 9, 49, during rotation of the pivoting disks 38, 39, the roller lever 40, 44 is set in a swinging movement. This swinging movement is transferred to the cam disks 9, 49, wherein, owing to obliquely running engagement of the second roller 42, 45 into a cutout 76 of the cam disk 9, 49, the pivot angle is increased during the transfer.

The in each case third roller 43, 46 protrudes to both sides into receiving disks 48 which are rotatably mounted in a housing 47, to one side into the first receiving disk 48 and to the other side into a second receiving disk which is not shown but which is of identical form. Here, the third roller 43 of the first roller lever 40 and the third roller 46 of the second roller lever 44 protrude into the respective receiving disk 48 in a manner offset by 180°.

The resulting antiphase movement of the two roller levers 40, 44 gives rise to a movement, offset by half of one phase, of the corresponding driving cam disks 9, 49. Therefore, during rotation of the input shaft 37, the two cam disks 9, 49 pivot back and forth, in each case in alternating fashion and in a manner offset by half of one phase. An identical swinging movement offset only by half of one phase is contributed to by the fact that the individual components of the changeover device 33 are implemented twofold and in identical form.

Figure 6:
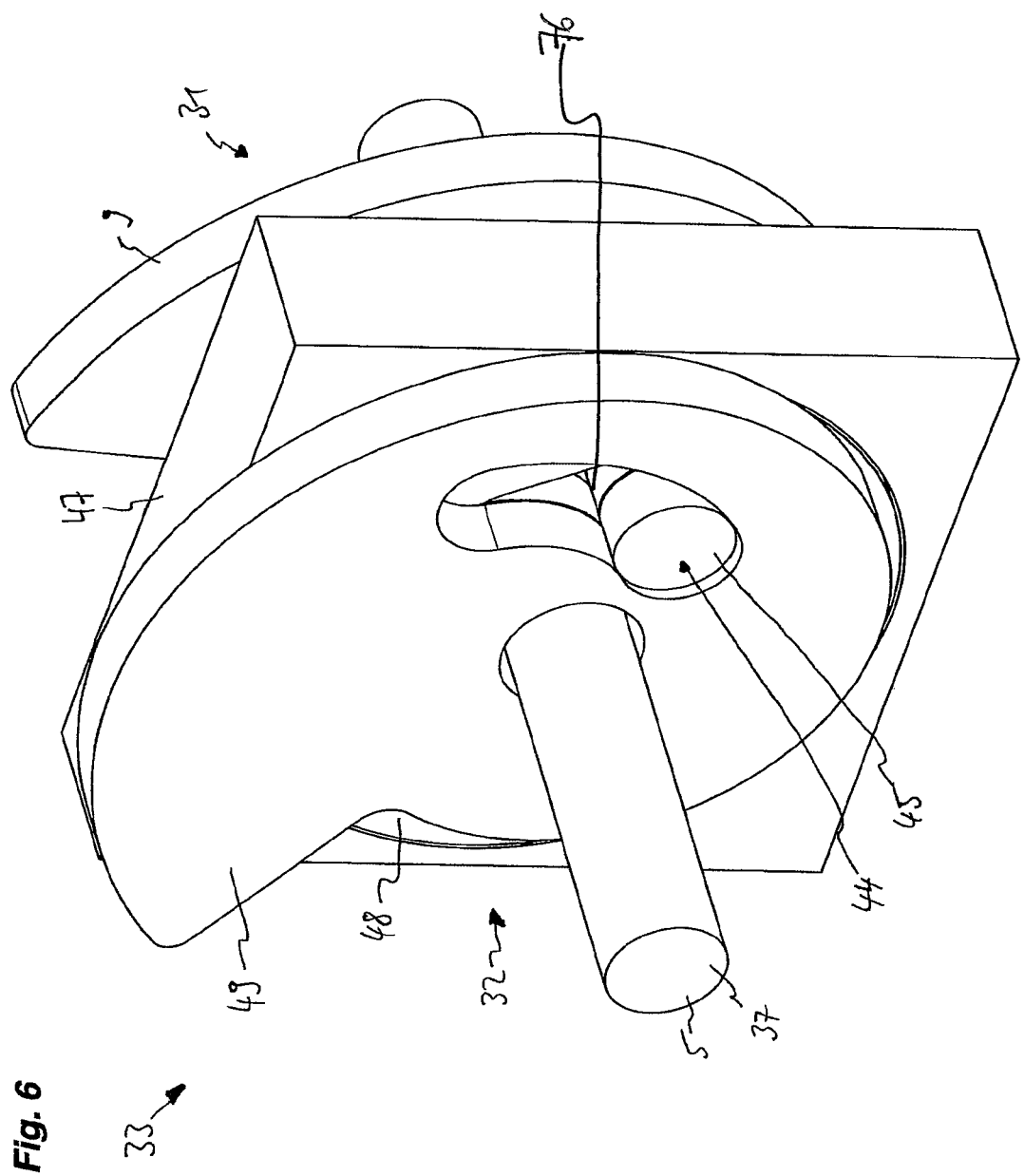

The changeover device 33 thus makes it possible for the transmission stages 2, 3, 4 to be implemented twofold to give a first implementation 72 of the transmission stage 2, 3, 4 and a second implementation 74 of the transmission stage 2, 3, 4. For example, the transmissions 1 shown in FIG. 1 and FIG. 2 may be implemented twofold and coupled to one another via the changeover device 33. FIG. 6 shows only the respective driving cam disk 9, 49 of the respective implementation 72, 74 of the transmission stage 2, 3, 4. The other components of the second implementation 74 correspond to the components of the first implementation 72.

The transmission 1 is furthermore configured such that one implementation 72, 74 of the transmission stage 2, 3, 4 is returned, free from load, into an initial state while the other implementation 72, 74 of the transmission stage 2, 3, 4 effects a transmission of force to the driven shaft 7, 8. For this purpose, in each case one freewheel is provided between the in each case final driven cam disk—this would be the cam disk 11 in FIG. 1 and the cam disk 12 in FIG. 2—and the corresponding driven shaft 7 or 8 respectively.

It may be provided that the swinging process of the cam disks 9, 49 in the direction intended for the transmission of force takes longer than the returning swinging process. In this way, despite a phase offset by half of one phase, it is possible to utilize a time overlap during which the two cam disks 9, 49 move in the direction provided for the transmission of force. Here, the time overlap should last long enough to permit a disruption-free takeover of the force transmission by the respective other implementation 72, 74 of the transmission stage 2, 3, 4.

Figure 7:
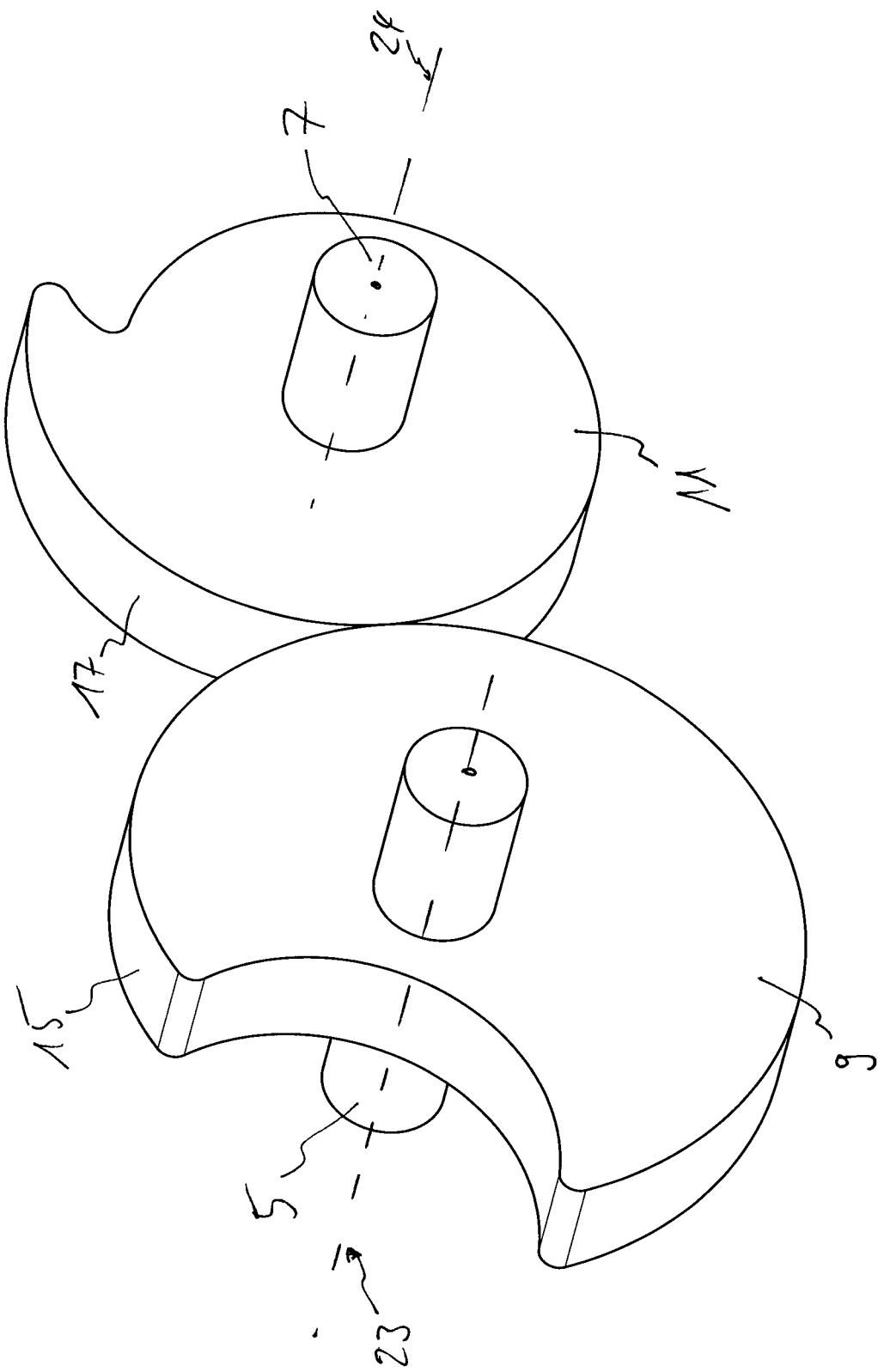
FIG. 7 shows a pair of cam disks 9, 11 by which a constant angular speed is converted into a linearly varying angular speed.
Figure 12:
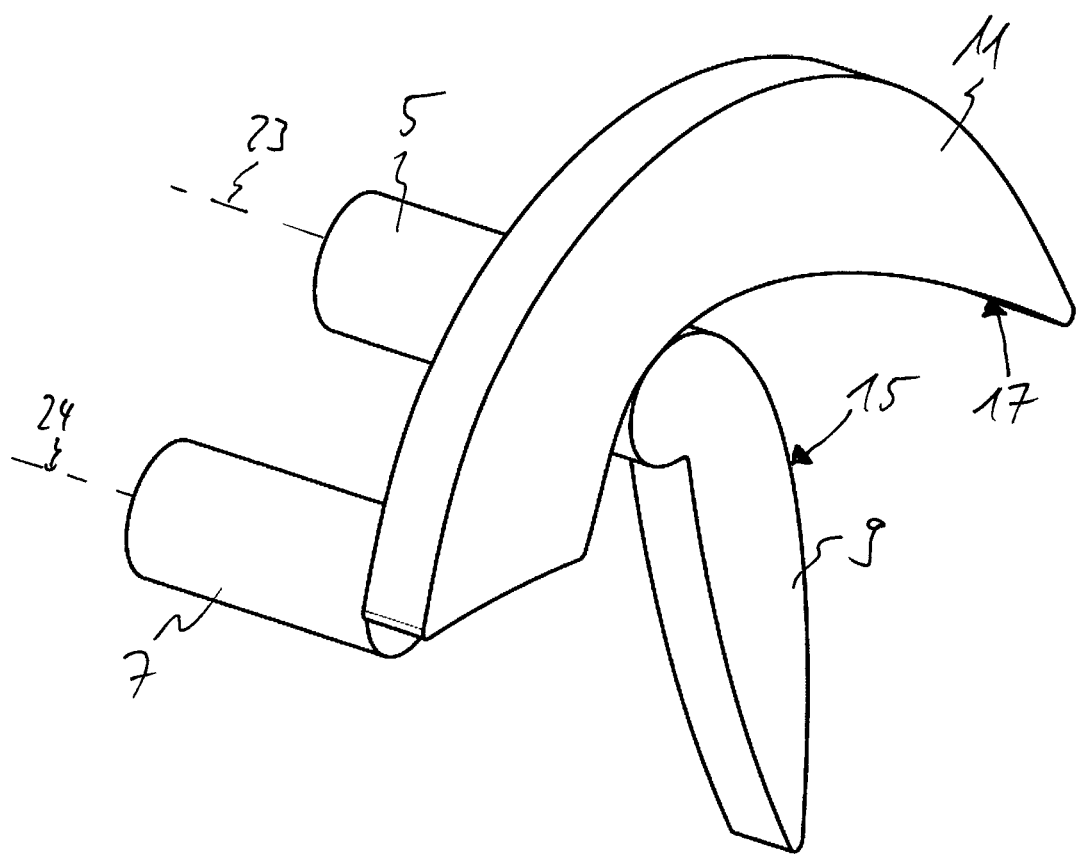
FIG. 12 shows a further pair of cam disks 9, 11 with linear conversion, wherein, in the case of a constant input, a change in direction can occur at the output.
Figure 13:
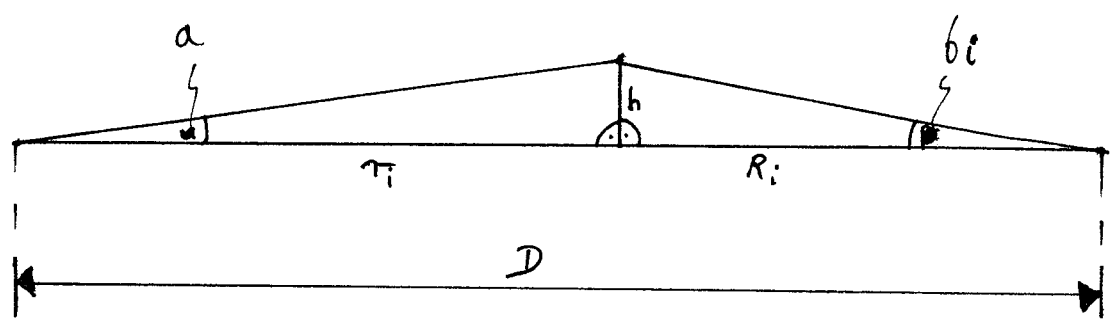
FIG. 13 shows an auxiliary sketch relating to the design of cam disks 9, 11 with linear conversion.

FIG. 7 illustrates a pair of cam disks 9, 11 according to the invention, which have outer contours 15, 17 which are shaped such that a constant angular speed of the driving cam disk 9 is converted into a linearly varying angular speed of the driven cam disk 11. The same applies to the pair of cam disks 9, 11 shown in FIG. 12, wherein the pair shown in FIG. 12 however has the peculiarity that a constant movement of the driving cam disk 9 firstly has the effect that the driven cam disk is moved in one direction, slows, comes to a standstill and is then moved in the other direction. In the case of the pair of cam disks 9, 11 shown in FIG. 7, however, no such direction reversal occurs. The cam disk pairs shown in FIGS. 7 and 12 have been constructed as described further above and discussed in more detail in FIG. 13.

Figure 8:
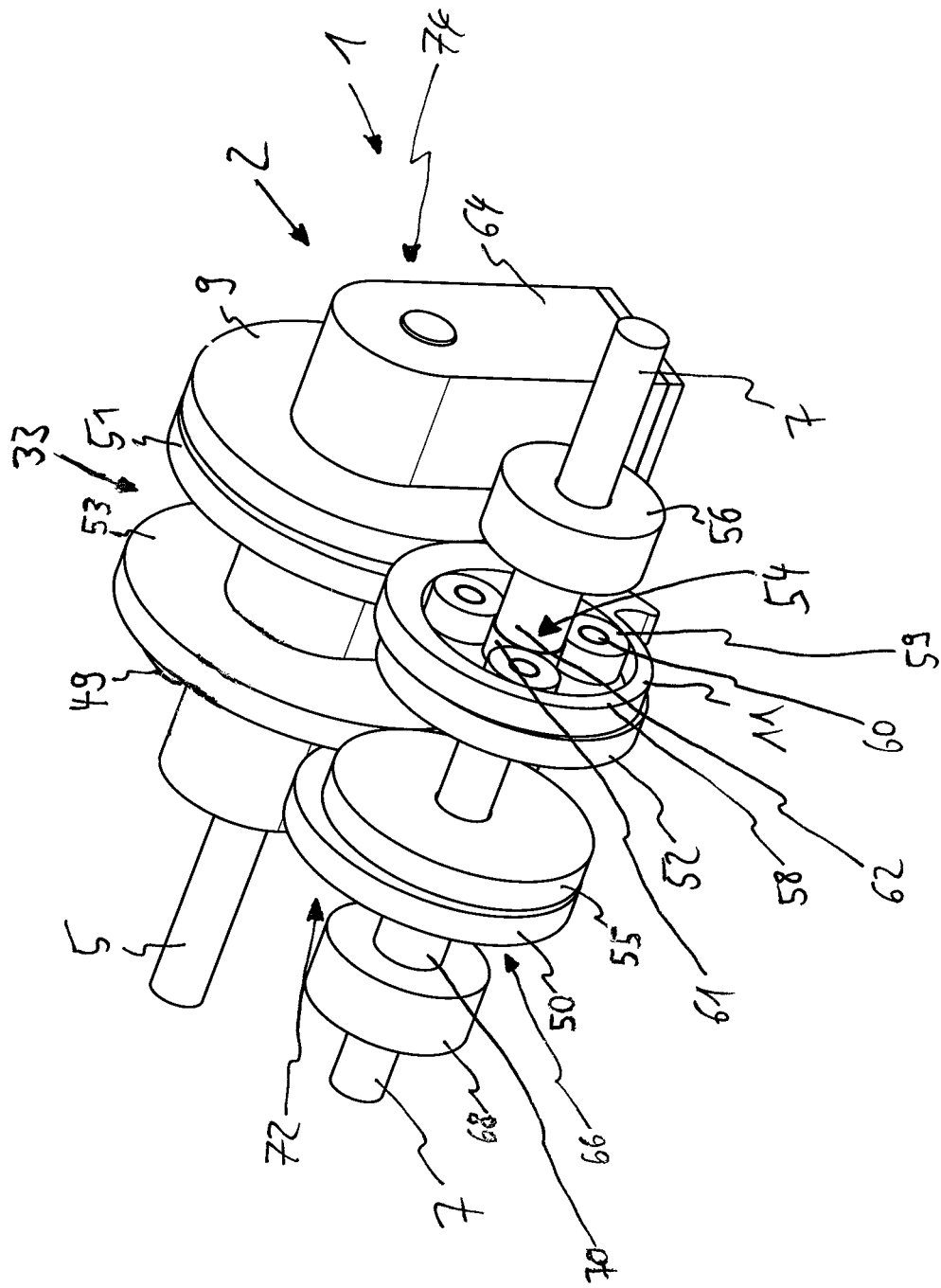
FIG. 8 to FIG. 11 show a further continuously variable transmission 1 according to the invention, by which a positive and a negative transmission ratio can be set.
Figure 9:
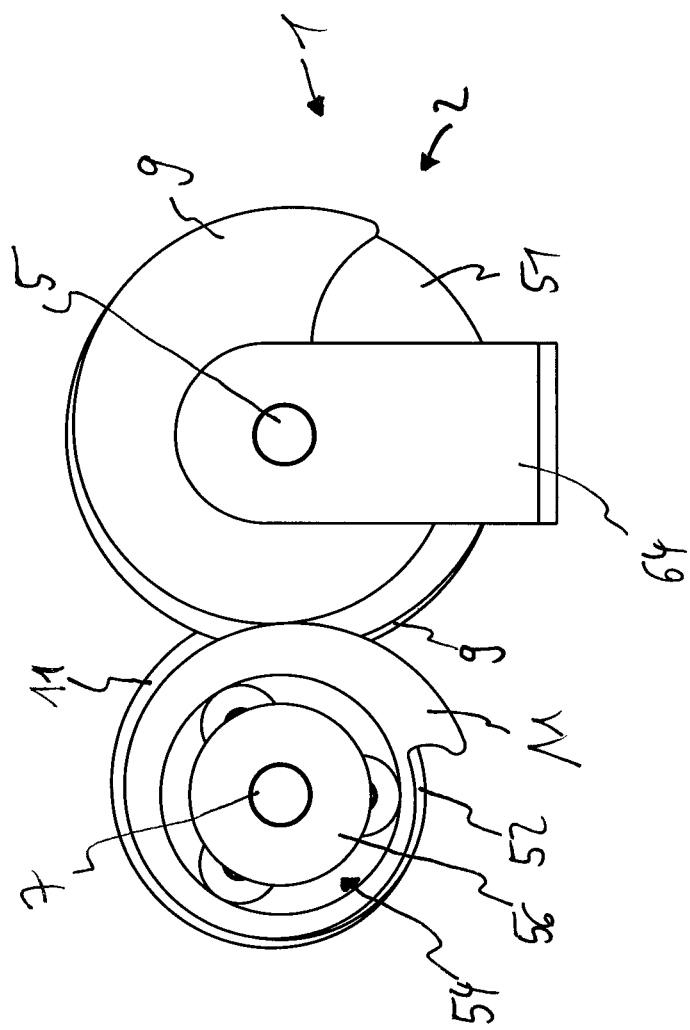
Figure 10:
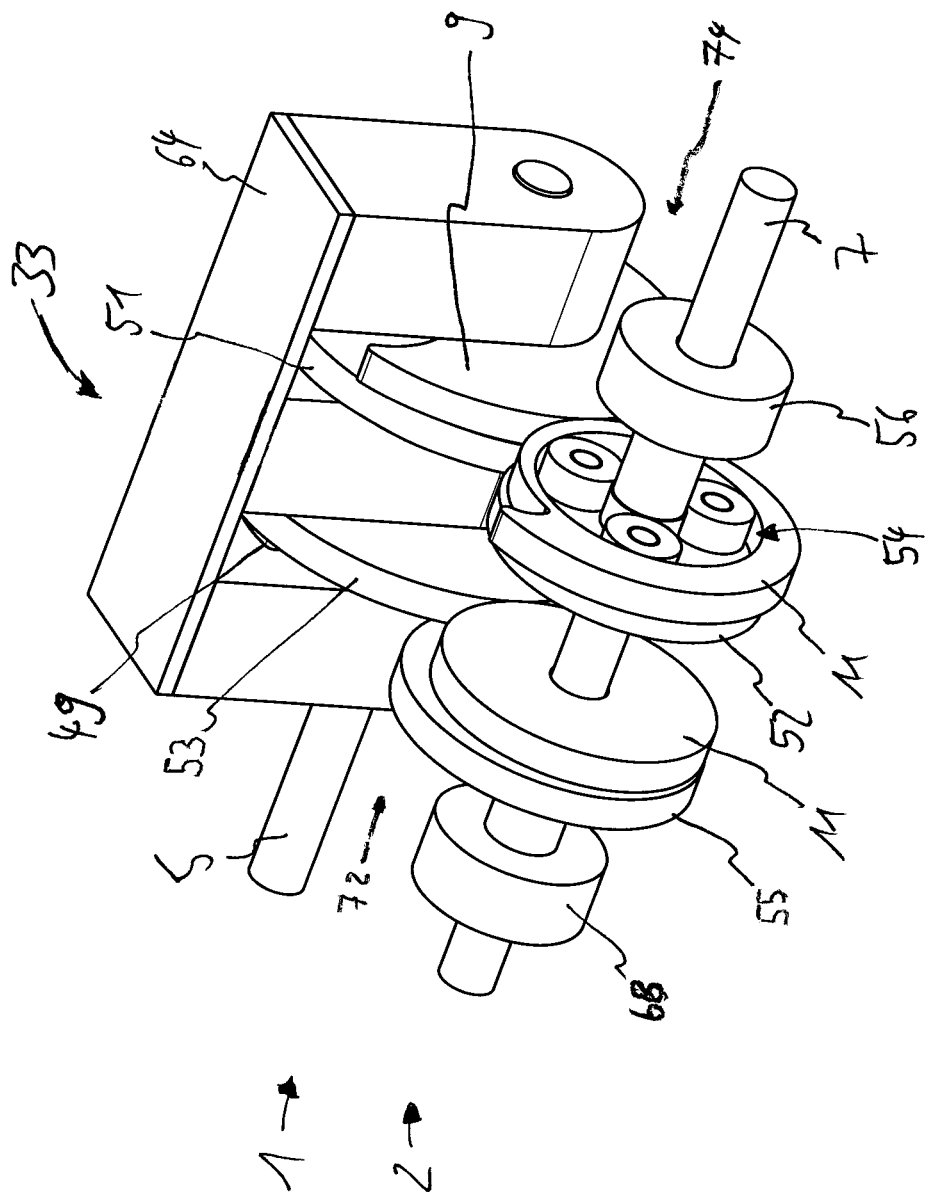
Figure 11:
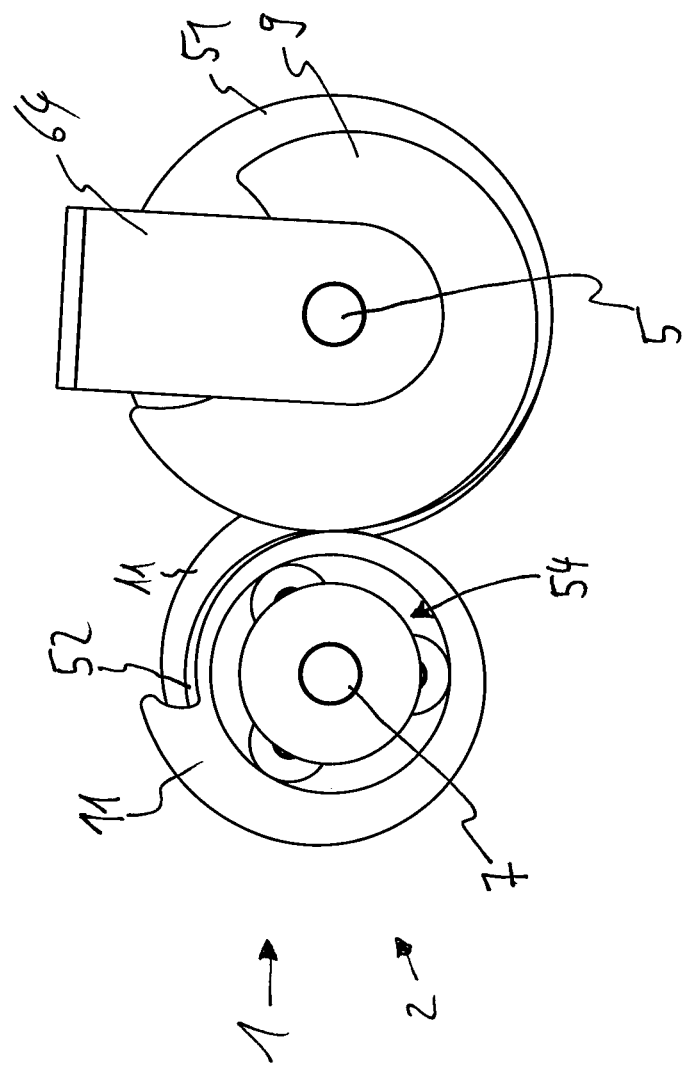

FIG. 8 to FIG. 11 show a continuously variable transmission 1 according to the invention which uses the cam disks 9, 11 shown in FIG. 7. FIG. 8 and FIG. 9 show a first setting of the transmission 1 in a perspective view (FIG. 8) and in a side view (FIG. 9). FIG. 10 and FIG. 11 show the same transmission 1, with the lever 64 in a different setting.

The transmission 1 has a transmission stage 2 which is implemented twofold. The two implementations 72, 74 of the transmission stage 2 are of virtually identical form. They each have a spiral-shaped driving cam disk 9, 49 and a spiral-shaped driven cam disk 11, 50, which cam disks are, via a changeover device 33 arranged in the lever 64, set in a swinging movement by a rotational movement on the driving shaft 5, wherein the swinging movements of the two implementations 72, 74 of the transmission stage 2 are phase-offset by half of one period. In the case of a constant rotation of the driving shaft 5, the angular speed of the respective driven shaft 11, 50 thus changes linearly over time during a swinging movement owing to the configuration of the cam disks 9, 11, 49, 50. Here, the changeover device 33 is designed similarly to that described above, but is not identical, because not only the two driving cam disks 9, 49 but also, as described above, the two driving adjacently mounted cam disks 51, 53 are driven by means thereof.

Two further pairs of cam disks 51, 52, 53, 55 are also driven by the changeover device 33. Here, the driving adjacently mounted cam disks 51, 53 and the driven adjacently mounted cam disks 52, 55 are of circular form. These cam disks 51, 53, 52, 55 are thus circular disks. However, linearizing means are formed which have the effect that the driving adjacently mounted cam disks 51, 53 are set in a swinging movement by the driving shaft 5, the instantaneous angular speed of which swinging movement varies linearly with the pivot angle. Such linearizing means may be provided for example by a modification of a changeover device 33 already described above, for example by virtue of the shape of the pivoting disks 38, 39 and/or an engagement angle and/or a geometry of a cutout 76 of the driving adjacently mounted cam disks 51, 53 being adapted so as to result in a linearly varying swinging movement. It is alternatively possible to dispense with such linearizing means if the adjacently mounted cam disks 51, 52, 53, 55 also lead to a linear conversion if cam disks as shown in FIG. 7 or similar cam disks are thus used therefor. The adjacently mounted cam disks 51, 52, 53, 55 of the two implementations 72, 74 of the transmission stage 2 perform swinging movements which are phase-offset by half of one period.

The swinging movements of the driven cam disks 11, 50 and of the driven adjacently mounted cam disks 52, 55 are, for each implementation 72, 74 of the transmission stage 2, superposed on one another by a differential device 54, 66. In the exemplary embodiment shown, the differential devices 54, 66 are each designed as a planetary transmission. The internal gear 58 forms a first input of the differential device 54, 66 and is in this case formed by a recess of the driven cam disk 11, 50, the planet carrier 60 of the planetary transmission forms a second input of the differential transmission 54, 66 and is connected rotationally conjointly to the driven adjacently mounted cam disks 52, 55, and the sun gear 61 is connected to an output shaft 62, 70 formed as a hollow shaft. Here, the output shafts 62, 70 are mounted about the driven shaft 7, which extends from one side of the transmission stage 2 to the other side of the transmission stage 2.

Therefore, with the differential device 54, 66, the swinging movements of the driven adjacently mounted cam disks 52, 55 and of the driven cam disks 11, 40 are linearly superposed, such that the respective output shaft 62, 70 performs the superposed swinging movement. Due to the construction, the swinging movements of the cam disks 9, 11, 49, 50 have the effect, as already described, that, during the course of a swinging movement, the angular speed of the output shaft 62, 70 linearly varies. Such a linear change is also effected by the adjacently mounted cam disks 51, 52, 53, 55.

The transmission 1 is configured such that, as a result, the linear changes cancel one another out at the output shaft 62, 70. For this purpose, it must firstly be ensured that a linear increase effected by the first input is associated with a linear decrease effected by the second input. This may be taken into consideration for example already at the drive of the driving adjacently mounted cam disk 51, 52, 53, 55, or else by the orientation of the cam disks 9, 11, 49, 50. Furthermore, it must be ensured that the increase and corresponding decrease are in each case of equal magnitude and thus compensate one another. This may be realized through corresponding configuration of the cam disks 9, 11, 49, 50 or adjacently mounted cam disks 51, 52, 53, 55, for example through suitable selection of the radius of the driven adjacently mounted cam disk 52, 55. It must be noted here that the planetary transmission has two different transmission ratios, such that the pitches of the two inputs must be selected such that the two different transmission ratios of the planetary transmission yield the same pitch at the sun gear 61.

As a result, therefore, the output shafts 62, 70 perform alternating swinging movements with constant angular speed during a working swinging movement. The alternating working swinging movements are then transmitted via a clutch 56, 68 to the driven shaft 7. Here, a torque is transmitted to the driven shaft 7 only in the respective working swinging movement. For this purpose, the clutch 56, 68 may for example be formed as a freewheel clutch. A freewheel clutch may however not be expedient, for example if it is the intention for a transmission of force to also occur during backward operation. The clutch 56, 68 may therefore also be designed differently, as long as means are provided which have the effect that the clutch 56, 68 is engaged only during the working swinging movement but not during the backward swinging movement. Due to the alternating swinging movements of the two implementations 72, 74 of the transmission stage 2, the alternating swinging movements are therefore combined into a constant rotational movement of the driven shaft 7. In this way, a reconverter is provided which combines the swinging movements into a rotational movement again.

Such a reconverter with two clutches 56, 68, which may preferably be designed as freewheel clutches, may also be used in alternative exemplary embodiments, in which for example the above-described exponential spiral-shaped cam disks are used, in order to reconvert a swinging movement generated by a changeover device 33 into a rotational movement. The generation of an interposed swinging movement may be provided in order to permit a continuously variable adjustment as described above for example in conjunction with exponential cam disks.

With the transmission 1 shown in FIG. 8 to FIG. 11, a transmission ratio can be adjusted in continuously variable fashion by relative rotation of the lever 64 about the driving shaft 5. Here, the transmission ratio may also undergo a direction reversal. It is thus possible that, through variation of the position of the lever 64, the ratio of the angular speeds of the driven shaft 7 and of the driving shaft 5 can be set positive, zero or negative, wherein the transmission ratio remains constant if the position of the lever 64 is held fixed.

To achieve this, a receiving disk 48 of the changeover device 33 (in this regard, cf. FIG. 6) is connected rotationally conjointly to the lever 64, wherein the receiving disk 48 is coupled to the driving adjacently mounted cam disks 51, 53 but not to the driving cam disks 9, 49. If the lever 64 is now moved, then the working swinging movement of the adjacently mounted cam disks 51, 52, 53, 55, but not the working swinging movement of the cam disks 9, 11, 49, 50, is varied. It is achieved in this way that, in the case of a uniform angular speed at the driving shaft 5, the linear range of angular speeds passed through by the adjacently mounted cam disks 51, 52, 53, 55 is varied. Thus, the angular speed prevailing at the driven shaft 7 varies. Depending on which linear range is being passed through by the working swinging movement of the adjacently mounted cam disks 51, 52, 53, 55, the superposed angular speed of the driven shaft 7 may be positive, zero or negative.

In summary, it is provided according to the invention, in the case of a continuously variable transmission 1, that the cam disks 9, 10, 11, 12 be designed to be not circular, as is conventional, but rather spiral-shaped. The outer contours 15, 16, 17, 18 of the two cam disks 9, 10, 11, 12 are in this case arranged in each case in one plane, which is generally oriented perpendicular to the direction of rotation of the respective cam disk 9, 10, 11, 12.

LIST OF REFERENCE DESIGNATIONS

1 Continuously variable transmission
2 Transmission stage
3 First transmission stage
4 Second transmission stage
5 Driving shaft
6 Further driving shaft
7 Driven shaft
8 Further driven shaft
9 Driving cam disk
10 Further driving cam disk
11 Driven cam disk
12 Further driven cam disk
13 Force-transmitting means
14 Further force-transmitting means
15 Outer contour of 9
16 Outer contour of 10
17 Outer contour of 11
18 Outer contour of 12
19 Belt
20 Further belt
21 Radial spacing
22 Further radial spacing
23 Spiral axis
24 Further spiral axis
25 Means
26 Force action point
27 Further force action point
28 Axis spacing
29 Diverting roller
30 Portion of 13 or 14
33 Changeover device
34 Rotation axis
35 Pivot axis
36 Relative-rotation device
37 Input shaft
38 First pivoting disk
39 Second pivoting disk
40 First roller lever
41 First roller of 40
42 Second roller of 40
43 Third roller of 40
44 Second roller lever
45 Second roller of 44
46 Third roller of 44
47 Housing
48 First receiving disk
49 Further cam disk
50 Further cam disk
51 Driving adjacently mounted cam disk
52 Driven adjacently mounted cam disk
53 Further driving adjacently mounted cam disk
54 Differential device
55 Further driven adjacently mounted cam disk
56 Clutch
58 Internal gear
59 Planet gear
60 Planet carrier
61 Sun gear
62 Output shaft
64 Lever
66 Further differential device
68 Further clutch
70 Further output shaft
72 A first implementation of a transmission stage
74 A second implementation of a transmission stage
76 Cutout

The invention claimed is:

1. A continuously variable transmission (1), comprising:
a transmission stage (2, 3, 4), which has a driving shaft (5, 6) which rotates about a first rotation axis and a driven shaft (7, 8) which rotates about a second rotation axis,
a driving cam disk (9, 10) coupled to the driving shaft (5, 6) and a driven cam disk (11, 12) coupled to the driven shaft (7, 8),
the driving cam disk (9, 10) and the driven cam disk (11, 12) are coupled to one another in terms of movement via at least one force-transmitting element (13, 14),
the driving cam disk (9, 10) and the driven cam disk (11, 12) each have a spiral-shaped outer contour (15, 16, 17, 18),
the outer contour (15, 16) of the driving cam disk (9, 10) is arranged in a first plane, which is oriented perpendicular to the first rotation axis,
the outer contour (17, 18) of the driven cam disk (11, 12) is arranged in a second plane, which is oriented perpendicular to the second rotation axis,
the transmission stage (2, 3, 4) is implemented twofold, and the cam disks (9, 10, 11, 12, 49, 50) of a first implementation (72, 74) of the transmission stage (2, 3, 4) are, during operation, able to swing in a phase-offset manner in relation to the cam disks (9, 10, 11, 12, 49, 50) of a second implementation (72, 74) of the transmission stage (2, 3, 4), a changeover device (33) is formed, by which a rotational movement of the driving shaft (5, 6) is converted into a phase-offset swinging movement of mutually corresponding cam disks (9, 10, 11, 12, 49, 50) of the first and second implementations (72, 74) of the transmission stage (2, 3, 4), and a reconverter configured to combine the phase-offset swinging movement of the mutually corresponding cam disks (9, 10, 11, 12, 49, 50) of the first and second implementations (72, 74) of the transmission stage (2, 3, 4) into a rotational movement of the driven shaft (7, 8).

2. The continuously variable transmission (1) as claimed in claim 1, wherein at least one of the first rotation axis and the second rotation axis are parallel or coincide with one another, or the first plane and the second plane are parallel or coincide with one another.

3. The continuously variable transmission (1) as claimed in claim 1, wherein the force-transmitting element (13, 14) is selected from the group of a belt (19, 20), a ban, a chain, or a toothing of the cam disks (9, 10, 11, 12).

4. The continuously variable transmission (1) as claimed in claim 1, wherein the spiral-shaped outer contours (15, 16, 17, 18) of the driving cam disk (9, 10) and of the driven cam disk (11, 12) are oriented in a same direction.

5. The continuously variable transmission (1) as claimed in claim 1, wherein the outer contour (15, 16, 17, 18) of at least one of the driving cam disk (9, 10) or of the driven cam disk (11, 12) is shaped such that at least one of a transmission ratio of the transmission stage (2, 3, 4) remains constant during a movement of the driving cam disk (9, 10) and of the driven cam disk (11, 12), a ratio of the angular speeds of the driving cam disk (9, 10) and of the driven cam disk (11, 12) remains constant, or a ratio of a torque acting at the driving shaft (5, 6) and of a torque effected at the driven shaft (7, 8) remains constant.

6. The continuously variable transmission (1) as claimed in claim 1, wherein the spiral-shaped outer contours (15, 16, 17, 18) of the driving cam disk (9, 10) and of the driven cam disk (11, 12) are oriented in opposite directions.

7. The continuously variable transmission (1) as claimed in claim 1, wherein at least one of the outer contour (15, 16) of the driving cam disk (9, 10) or the outer contour (17, 18) of the driven cam disk (11, 12) is shaped such that at least one of a transmission ratio of the transmission stage (2, 3, 4) behaves exponentially during a movement of the driving cam disk (9, 10) with constant angular speed, a ratio of the angular speeds of the driving cam disk (9, 10) and of the driven cam disk (11, 12) behaves exponentially, or a ratio of a torque acting at the driving shaft (5, 6) and of a torque effected at the driven shaft (7, 8) behaves exponentially.

8. The continuously variable transmission (1) as claimed in claim 1, wherein the spiral-shaped outer contours (15, 16, 17, 18) each describe a mathematical curve, a radial spacing (21, 22) of which from a respective spiral axis (23, 24) is at least one of exponential in an arc length of the curve or exponential in an angle about the respective spiral axis (23, 24).

9. The continuously variable transmission (1) as claimed in claim 1, wherein at least one of the outer contour (15, 16) of the driving cam disk (9, 10) or the outer contour (17, 18) of the driven cam disk (11, 12) is shaped such that at least one of a transmission ratio of the transmission stage (2, 3, 4) behaves linearly during a movement of the driving cam disk (9, 10) with constant angular speed, a ratio of the angular speeds of the driving and driven cam disks (9, 10, 11, 12) behaves linearly, or a ratio of a torque acting at the driving shaft (5, 6) and of a torque effected at the driven shaft (7, 8) behaves linearly.

10. The continuously variable transmission (1) as claimed in claim 1, wherein the spiral-shaped outer contours (15, 16, 17, 18) each describe a mathematical curve, a radial spacing (21, 22) of which from a respective spiral axis (23, 24) is described by a mathematical function, of which a first derivative with respect to an arc length of the curve or with respect to an angle about the respective spiral axis (23, 24) is monotonously decreasing.

11. The continuously variable transmission (1) as claimed in claim 1, wherein a differential device (54) is formed by which a movement of the driven cam disk (11, 12) and a movement of a driven adjacently mounted cam disk (52) are linearly superposed, and with the differential device (54), a linearly varying movement profile of the driven cam disk (11, 12) or is compensated by way of a linearly varying movement profile of the driven adjacently mounted cam disk (52).

12. The continuously variable transmission (1) as claimed in claim 1, wherein the transmission stage (2, 3, 4) comprises means (25, 29) with which an advancing force action point (26), formed on the outer contour (15, 16) of the driving cam disk (9, 10), for the force-transmitting element (13, 14) and an advancing force action point (27), formed on the outer contour (17, 18) of the driven cam disk (11, 12), for the force-transmitting element (13, 14) are movable relative to one another.

13. The continuously variable transmission (1) as claimed in claim 1, wherein the driving cam disk (9, 10) and the driven cam disk (11, 12) are arranged so as to be spaced apart with an axis spacing (28) to one another, wherein the axis spacing (28) is variable, or between the driving and the driven cam disk (9, 10, 11, 12), there is arranged a movable diverting roller (29) by which a length of a force-transmitting portion (30) of the force-transmitting element (13, 14) is variable, or the axis spacing between the driving cam disk (9, 10) and the driven cam disk is variable and the movable diverting roller is configured to vary a length of the force-transmitting element.

14. The continuously variable transmission (1) as claimed in claim 1, wherein the cam disks (9, 10, 11, 12, 49, 50) of the first implementation (72, 74) of the transmission stage (2, 3, 4) are, during operation, able to swing in an alternating manner in relation to the cam disks (9, 10, 11, 12, 49, 50) of the second implementation (72, 74) of the transmission stage (2, 3, 4).

15. The continuously variable transmission (1) as claimed in claim 1, further comprising a changeover device (33) by which a rotational movement of the input shaft (5, 6, 7, 8, 37) is converted into an alternating swinging movement of the mutually corresponding cam disks (9, 10, 11, 12, 49, 50) of the first and second implementations (72, 74) of the transmission stage (2, 3, 4), and the transmission (1) is configured such that the first implementation (72, 74) of the transmission stage (2, 3, 4) is returned, free from load, into an initial state while the second implementation (72, 74) of the transmission stage (2, 3, 4) effects a transmission of force to the driven shaft (7, 8).

16. The continuously variable transmission (1) as claimed in claim 1, wherein the reconverter which is configured to combine the alternating swinging movement of the mutually corresponding cam disks (9, 10, 11, 12, 49, 50) of the first and second implementations (72, 74) of the transmission stage (2, 3, 4) into a rotational movement of the driven shaft (7, 8), and the reconverter has, for each implementation (**72, 74) of the transmission stage (2, 3, 4), in each case one clutch (56, 68) which transmits a torque to the driven shaft (7, 8) during a working swinging movement of the respective implementation (72, 74) of the transmission stage (2, 3, 4).

17. The continuously variable transmission (1) as claimed in claim 1, wherein the transmission stage (2, 3, 4) includes a first transmission stage (2, 3, 4) and a second transmission stage (2, 3, 4), and the driven cam disk (11, 12) of the first transmission stage (2, 3, 4) and the driving cam disk (9, 10) of the second transmission stage (2, 3, 4) are coupled angularly consistently with respect to one another, and have a common rotation or pivot axis (34, 35).

18. The continuously variable transmission (1) as claimed in claim 17, wherein a ratio of radial spacings (21, 22) of force action points (26, 27) to the respective spiral axis (23, 24) to one another remains constant in that $r\_1a/r\_1b*r\_2a/r\_2b=\text{const}$, where $r\_xy$ describes the radial spacing (21, 22) of the force action point (26, 27) of the cam disk (9, 10, 11, 12) xy from the spiral axis (23, 24) xy, where xy=xa describes the driving cam disk (9, 10) of the transmission stage (2, 3, 4) x, and xy=xb describes the driven cam disk (11, 12) of the transmission stage (2, 3, 4) x.

19. The continuously variable transmission (1) as claimed in claim 18, wherein, for the variation of a transmission ratio of the transmission (1), the driven cam disk (11, 12) of the first transmission stage (2, 3, 4) is rotatable relative to the driving cam disk (9, 10) of the second transmission stage (2, 3, 4).

20. A method for operating a continuously variable transmission (1) as claimed in claim 1, comprising implementing the transmission stage (2, 3, 4) which has the cam disk (9, 10, 11, 12) with the spiral-shaped outer contour (15, 16, 17, 18) twofold, and alternately engaging and disengaging the two implementations (72, 74) of the transmission stages (2, 3, 4) such that the respectively disengaged implementation (72, 74) of the transmission stage (2, 3, 4) is returned into an initial state while the respectively engaged implementation (72, 74) of the transmission stage (2, 3, 4) effects a transmission of force to the driven shaft (7, 8).

\* \* \* \* \*